United States Patent [19]
Carobolante et al.

[11] Patent Number: 5,793,183
[45] Date of Patent: Aug. 11, 1998

[54] MOTOR SYSTEM WITH INTERRUPTED PWM OSCILLATION

[75] Inventors: Francesco Carobolante, San Mateo; Rafael S. Lopez, Danville, both of Calif.

[73] Assignee: SGS-Thomson Microelectronics, Inc., Carrollton, Tex.

[21] Appl. No.: 772,383

[22] Filed: Dec. 23, 1996

Related U.S. Application Data

[63] Continuation of Ser. No. 486,314, Jun. 7, 1995.

[51] Int. Cl.[6] .................................................. H02P 05/408
[52] U.S. Cl. ........................ 318/811; 318/254; 318/599; 363/41; 388/811
[58] Field of Search .................................. 318/254, 138, 318/439, 606, 798, 811, 599, 723; 363/41, 98; 388/811, 819

[56] References Cited

U.S. PATENT DOCUMENTS

| | | |
|---|---|---|
| 3,749,891 | 7/1973 | Burrows et al. . |
| 4,044,296 | 8/1977 | Dhyanchand et al. . |
| 4,371,803 | 2/1983 | Schindel et al. . |
| 4,389,588 | 6/1983 | Rankin . |
| 4,683,529 | 7/1987 | Bucher, II . |
| 4,868,441 | 9/1989 | Bulick . |
| 4,954,764 | 9/1990 | Kim ........................ 318/798 |
| 5,068,582 | 11/1991 | Scott ........................ 318/254 |
| 5,153,492 | 10/1992 | Landseadel . |
| 5,172,036 | 12/1992 | Cameron ................... 318/138 |
| 5,202,614 | 4/1993 | Peters et al. . |
| 5,202,616 | 4/1993 | Peters et al. . |
| 5,231,338 | 7/1993 | Bulgarelli et al. . |
| 5,233,275 | 8/1993 | Danino . |
| 5,258,695 | 11/1993 | Utenick et al. . |
| 5,258,696 | 11/1993 | Le . |
| 5,285,135 | 2/1994 | Carobolante et al. ........... 318/254 |
| 5,294,877 | 3/1994 | Cameron ........................ 318/809 |
| 5,309,078 | 5/1994 | Cameron ........................ 318/811 |
| 5,317,243 | 5/1994 | Cameron ........................ 318/254 |
| 5,317,248 | 5/1994 | Utley et al. .................... 318/811 |
| 5,319,289 | 6/1994 | Austin et al. . |
| 5,329,198 | 7/1994 | Schmidt et al. . |
| 5,343,127 | 8/1994 | Maiocchi . |
| 5,414,317 | 5/1995 | Reid et al. . |
| 5,423,192 | 6/1995 | Young et al. . |
| 5,434,463 | 7/1995 | Horski . |
| 5,491,978 | 2/1996 | Young et al. .................. 361/22 |
| 5,504,402 | 4/1996 | Menegoli ....................... 318/377 |
| 5,506,487 | 4/1996 | Young et al. .................. 318/811 |
| 5,543,697 | 8/1996 | Carobolante et al. ........... 318/594 |

OTHER PUBLICATIONS

Gariboldi, "Motion Control," appearing in *Smart ICs*, Murari et al., Eds., 1995, Chapter 6, pp. 225–283.

IEEE Transactions on Consumer Electronics, vol. 35, No. 3, Aug. 1989, "A Full-Wave Motor Drive IC Based on the Back-EMF Sensing Principle", Bahlmann, pp. 415–420.

Electronic Components and Applications, vol. 10, No. 3, Full-Wave Sensorless drive ICs for brushless DC motors:, Dominique Pouilloux, pp. 2–11.

Proceedings of the Conference on Drives/Motors/Controls 1984, Paraskeva et al., "Microprocessor Control of a brushless DC Motor".

Self Synchronisation of PM Step and Brushless Motors; A New Sensorless Approach:, Antognini et al.

*Primary Examiner*—John W. Cabeca
*Attorney, Agent, or Firm*—Steve D. Beyer; Theodore E. Galanthay; Lisa K. Jorgenson

[57] ABSTRACT

A brushless DC motor system using PWM switching, in which the PWM switching is temporarily frozen whenever a zero crossing is expected in the back EMF. This avoids disruption of zero-crossing detection due to switching transients from the power transistor.

20 Claims, 8 Drawing Sheets

MOTOR SYSTEM WITH INTERRUPTED PWM OSCILLATION

This is a continuation of application Ser. No. 08/486,314, filed Jun. 7, 1995.

BACKGROUND AND SUMMARY OF THE INVENTION

The present invention relates to brushless motor systems which operate without position sensing.

Background: Control of Brushless Sensorless DC Motors Generally

Recent years have seen great simplification of DC motors, with corresponding benefits in cost and reliability. Historically most DC motors have used brushes to provide current to the correct phase of the rotor windings, and this persists in motors for consumer products; but for products where reliability and lifetime are needed, electronic commutation is now used. By using semiconductor switches (e.g. FETs) to switch current to the appropriate field winding, the need for replacement of brushes, and the attendant ozone generation, production of conductive dust, and potential for sparking, can be avoided.

Initially electronic commutation was usually accomplished by using some other mechanism to sense the physical position of the rotor. The transducers are typically Hall cells mounted at strategic locations in the motor, in order to provide position information for the commutation circuitry. However, the need for these costly components can be eliminated by obtaining motor position information based on the BEMF of the unenergized (floating) winding.

"BEMF," or back electromotive force, is the voltage induced on a winding, by the changing magnetic field which is present inside the motor, when the winding is not being electrically driven by the external driving circuit. The proximity of a rotor pole contributes to the changes in the magnetic field (due to the magnetic field in the rotor), and therefore the BEMF provides some information about the instantaneous position of the rotor. Even though the magnitude of the BEMF is highly dependent on the specific motor architecture (and possibly also on the load conditions), a change in the sign of the BEMF will occur when a rotor pole passes the center of the floating armature coil. Thus detection of zero-crossings in the BEMF can in principle provide adequate information about rotor position.

The BEMF of the undriven phase of the motor is an accurate and repeatable reference for the motor phase. By differentially monitoring the voltage across the floating phase, the point at which the voltage is zero, or "zero crossing" can be established. With this information, timers (analog or digital) are used to commutate (switch to the next winding phase) at a particular angle, normally 20 to 30 electrical degrees after the zero crossing. There is also a large voltage transition during the commutation due to the flyback current of the motor windings. These flyback pulses also make transitions through zero and could cause erroneous indications of a zero crossing.

Many publications have discussed the problems of sensorless brushless DC motor control, including e.g. Pouilloux, "Full-wave sensorless drive ICs for brushless DC motors," 10 ELECTRONIC COMPONENTS & APPLICATIONS 2 (1991); Antognini et al., "Self synchronisation of PM step and brushless motors; a new sensorless approach," in ACTUATOR 90: PROCEEDINGS OF 2ND INTERNATIONAL TECHNOLOGY-TRANSFER CONGRESS at 44 (ed. K.Lenz 1990); Bahlmann, "A full-wave motor drive IC based on the back-EMF sensing principle," 35 IEEE TRANSACTIONS ON CONSUMER ELECTRONICS 415 (1989); Paraskeva et al., "Microprocessor control of a brushless DC motor," in PROCEEDINGS OF THE CONFERENCE ON DRIVES/MOTORS/CONTROLS 84 at 80 (1984); U.S. Pat. No. 5,343,127 of Maiocchi, "Start-up Procedure for a Brushless, Sensorless Motor;" U.S. Pat. No. 5,319,289 of Austin et al., "Adaptive Commutation Delay for Multi-pole Brushless DC Motors;" U.S. Pat. No. 5,202,616 of Peters et al., "Bipolar or Unipolar Drive Back-EMF Commutation Sensing Method;" Hanselman, BRUSHLESS PERMANENT-MAGNET MOTOR DESIGN (1994); and T. J. E. Miller, BRUSHLESS PERMANENT-MAGNET AND RELUCTANCE MOTOR DRIVES (1993); all of which are hereby incorporated by reference.

Background: Attempts to Refine Zero-Crossing Detection

Accurate position sensing in a sensorless motor requires accurate detection of zero-crossings in the floating leg of the motor. However, the switching of the power transistors creates a high-noise environment, and some of this electrical noise will often be coupled into the floating winding to create spurious zero-crossings.

Several approaches have therefore been proposed to obtain more accurate zero-crossing detection:

1) Sampling the Back EMF synchronously with the PWM switching;
2) Converting to linear driving before the time of expected detection; and
3) Interpolation or filtering of waveforms.

Approach 1 has the drawback of jitter in detection. Approach 2 has the drawback that the linear loop will have a long settling time. Approach 3 has the drawback that tunable filters or passive external components may be required, and that the filtering operation may cause delay of information.

Background: Power Transistor Control Using Pulse Modulation

When a power transistor is used to drive a load which can draw high current (such as a motor winding), the transistor's power dissipation will be high when it is only partially turned on. Thus in such applications the transistors are typically switched on or off (subject to slew rate constraints), but are not operated for any significant duration in an intermediate state. Therefore, when analog control of output current is required, this is commonly synthesized by switching the transistor with a waveform which is then averaged, by a capacitor of acceptable size, to provide the desired analog current waveform.

One of the most common ways to do this is pulse-width modulation (PWM). In pulse-width modulation the duration of each pulse is adjusted to provide the desired average current level; the pulses themselves may occur at a constant frequency, or may be separated by constant durations.

In motor control systems generally, the control logic gets one or more data inputs to determine the velocity of the motor, and accordingly controls transistor switching to apply the correct drive current to the motor windings. The control relation normally seeks to maintain the motor at a predetermined constant speed (or sometimes at a variable speed determined by a command input). In integrated motor control systems, the command outputs from the control logic are typically provided to a PWM circuit, which provides a pulse train with the desired duty cycle to the gate of a power FET (either directly or through additional buffering stages).

Various other pulse modulation schemes have been proposed, involving introduction of techniques such as burst length modulation or frequency modulation. However, the two types of PWM are extremely simple, and are the predominant technique used for motor control.

SUMMARY OF THE INVENTION

The present invention discloses motor systems which use a new way to perform accurate detection of zero-crossings. This invention exploits the capabilities of motor control systems which use pulse-width modulation (or analogous pulse modulation techniques).

Accurate detection of zero-crossings is most necessary when the motor is operating at speed, but at this time the motor controller can predict zero-crossings to within a few microseconds.

The present invention uses such prediction to freeze the state of the PWM oscillator which provides gate drive to the power transistor. This stretches the PWM waveform to assure that no switching will occur within a certain minimum time before sampling of the back EMF is enabled. This prevents switching noise from disrupting detection of zero crossings. As soon as the zero crossing is detected, the PWM oscillator is allowed to switch again. Since the frequency of switching is relatively high in a PWM system, a missed pulse or two will not introduce significant error in the angular velocity.

Preferably the signal which disables the oscillator also enables the zero-crossing detection circuitry, which in turn disables itself once a zero-crossing event is detected. This provides robust protection against detection of spurious zero-crossings at other times.

In the presently preferred embodiment, the PWM oscillator's output is simply frozen in its current state (high or low) when the control logic indicates that a zero crossing is due. In an alternative embodiment the PWM oscillator's output is driven to a predetermined state when this occurs.

Since zero-crossing detection is made more accurate, jitter in phase detection is reduced. A second advantage is that control loops which use zero-crossing detection are made more stable, since a noise input has been removed.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1A:
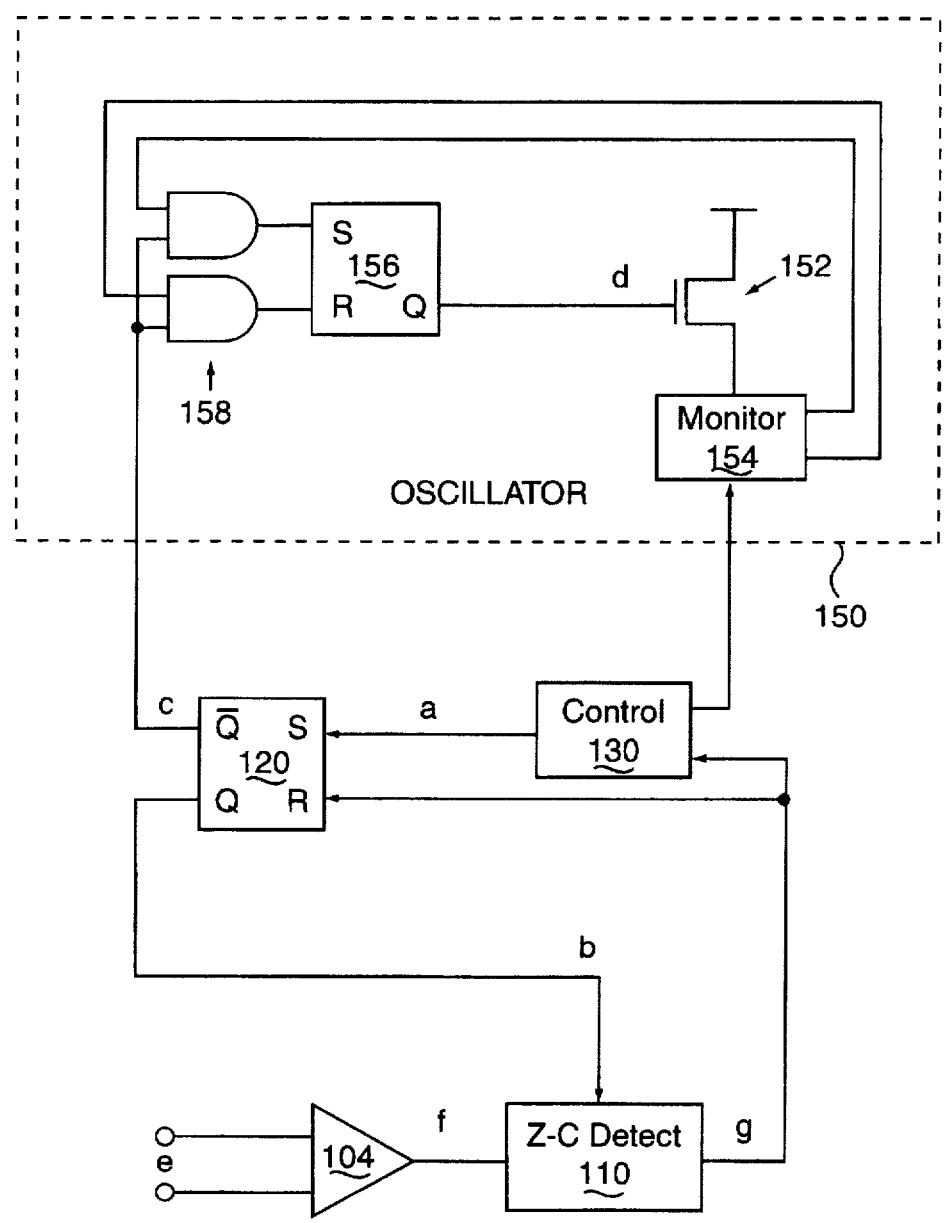
FIG. 1A shows key portions of a sample circuit implementation.

The numerous innovative teachings of the present application will be described with particular reference to the presently preferred embodiment (by way of example, and not of limitation), in which:

FIG. 1A shows key portions of a sample circuit implementation. In the circuit of FIG. 1A, a comparator 104 is connected (e.g. through a multiplexer) to sense the voltage on the currently-floating motor winding. This comparator 104 provides a digital input to a zero-crossing detector 110.

When the zero-crossing detector 110 detects a zero-crossing, it provides a high output to the reset terminal (R) of an RS flip-flop 120. The flip-flop 120 provides control outputs both to the zero-crossing detector 110 and to the oscillator 150.

The set terminal (S) of flip-flop 120 is driven by a signal from the motor control logic 130. This control logic is preferably provided by sequencer-controlled logic, as described below, but can of course be implemented in a great variety of known ways. The key function of this input is to provide a logic signal which is timed to activate the zero-crossing detector 110 just before the expected time of a zero-crossing event.

A key parameter is the amount of lead time during which the PWM state is locked. In a sample embodiment, with the PWM oscillator running at about 20 MHz (i.e. 50 μsec per pulse), we can use e.g. 100 μsec lead time (two pulses' duration), since omission of a pulse or two will not seriously disrupt the torque curve.

If the lead time is increased, the torque ripple increases.

If the lead time is decreased, the risk increases that a zero-crossing event might be missed or erroneously detected (introducing jitter in the phase determination).

The illustrated example of oscillator 150 is very simple: current-sensor 154 is indirectly connected to drive the set input (S) of an RS flip-flop 156 if the current passed by power device 152 is below a target minimum, and to drive the reset input (R) of flip-flop 156 if the current passed by power device 152 is above a target maximum. The Q output of the flip-flop 156 drives the gate of an NMOS switching transistor 152, and the sensor 154 is directly dependent on the state of transistor 152, so elements 152, 154, and 156 define a feedback relation which oscillates.

Note, however, that AND gates 158 are interposed in the oscillator loop. These gates are driven by the output of flip-flop 120, and so disable the oscillator loop when the set input of flip-flop 120 is activated.

Note that the circuit of FIG. 1A shuts off the zero-crossing detector after each detection, so this gives some additional protection against false Zero-crossing detect. However, this feature is not necessarily included in all embodiments of the invention.

When the flip-flop 120 has been reset by the zero-crossing detector, it disables the zero-crossing detector and unblocks the oscillator 150.

Figure 1B:
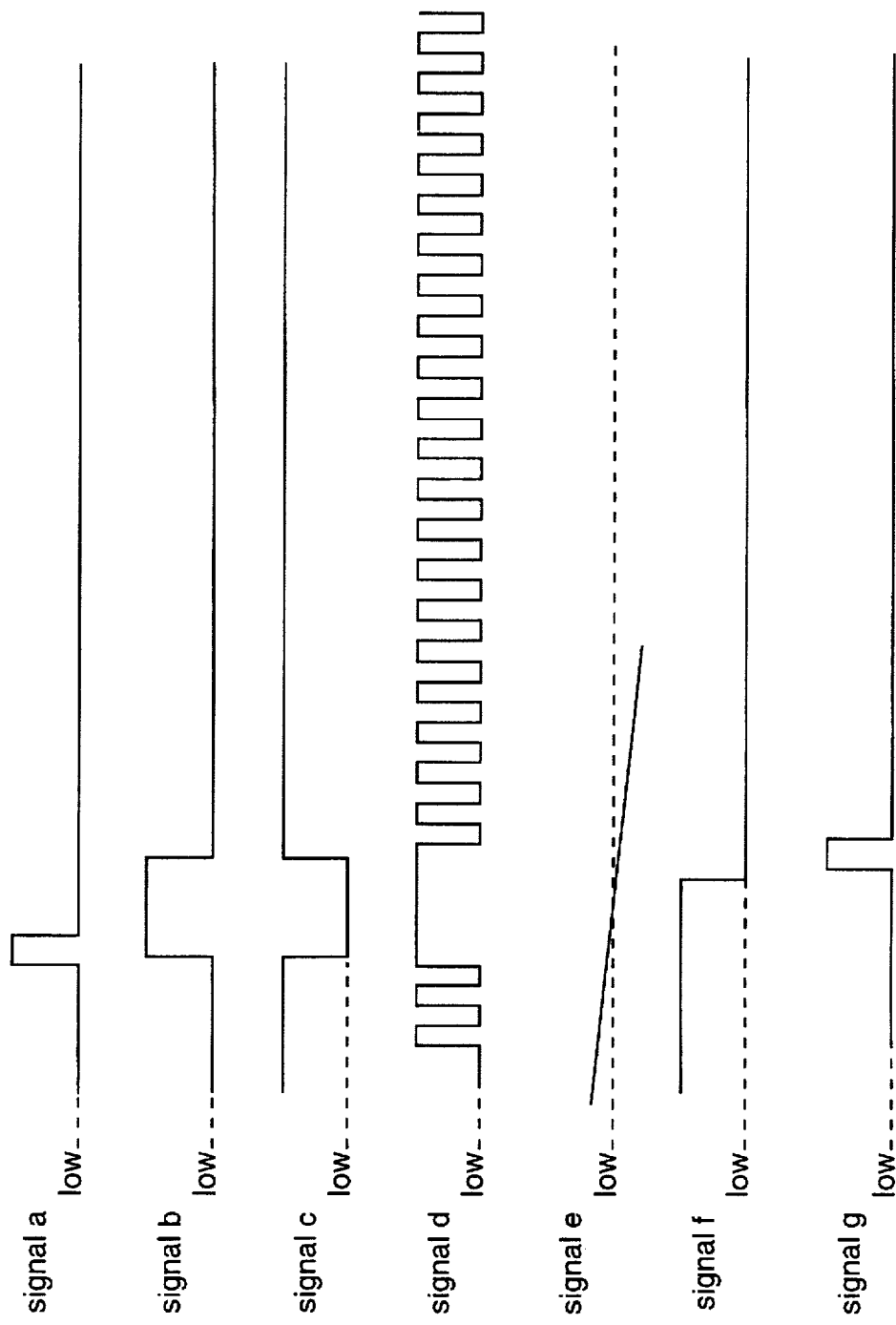
FIG. 1B shows sample timing waveforms from operation of the circuit of FIG. 1A.

FIG. 1B shows sample timing waveforms from operation of the circuit of FIG. 1A. The different traces are labelled a–g to show correspondence to the nodes labelled in the circuit diagram. For convenient graphic illustration, the PWM oscillator output (node d) has been represented in the drawings as if it had a unity duty cycle, but of course the duty cycle of this pulse train is actually variable.

The control logic provides a pulse on node a within a predetermined time before a zero-crossing is expected. After signal a goes high, lines b and c go high and low respectively, to enable the zero-crossing detector and freeze the PWM oscillator. The instantaneous state of node d (high in this example) is therefore stretched. This avoids switching noise while detection of the zero-crossing event is imminent.

After the analog signal e passes through zero, the comparator 104 changes state. (The comparator necessarily has a certain hysteresis, which produces a small but consistent delay before its digital output changes state.)

Once the comparator 104 changes state, the output g of the zero-crossing detector 110 (which has now been enabled) goes high. This output g resets the flip-flop 120, so that node b goes low again and node c goes high again. This enables the PWM oscillator to resume operation, and also disables the zero-crossing detector 110, so that node g again goes low.

Figure 2A:
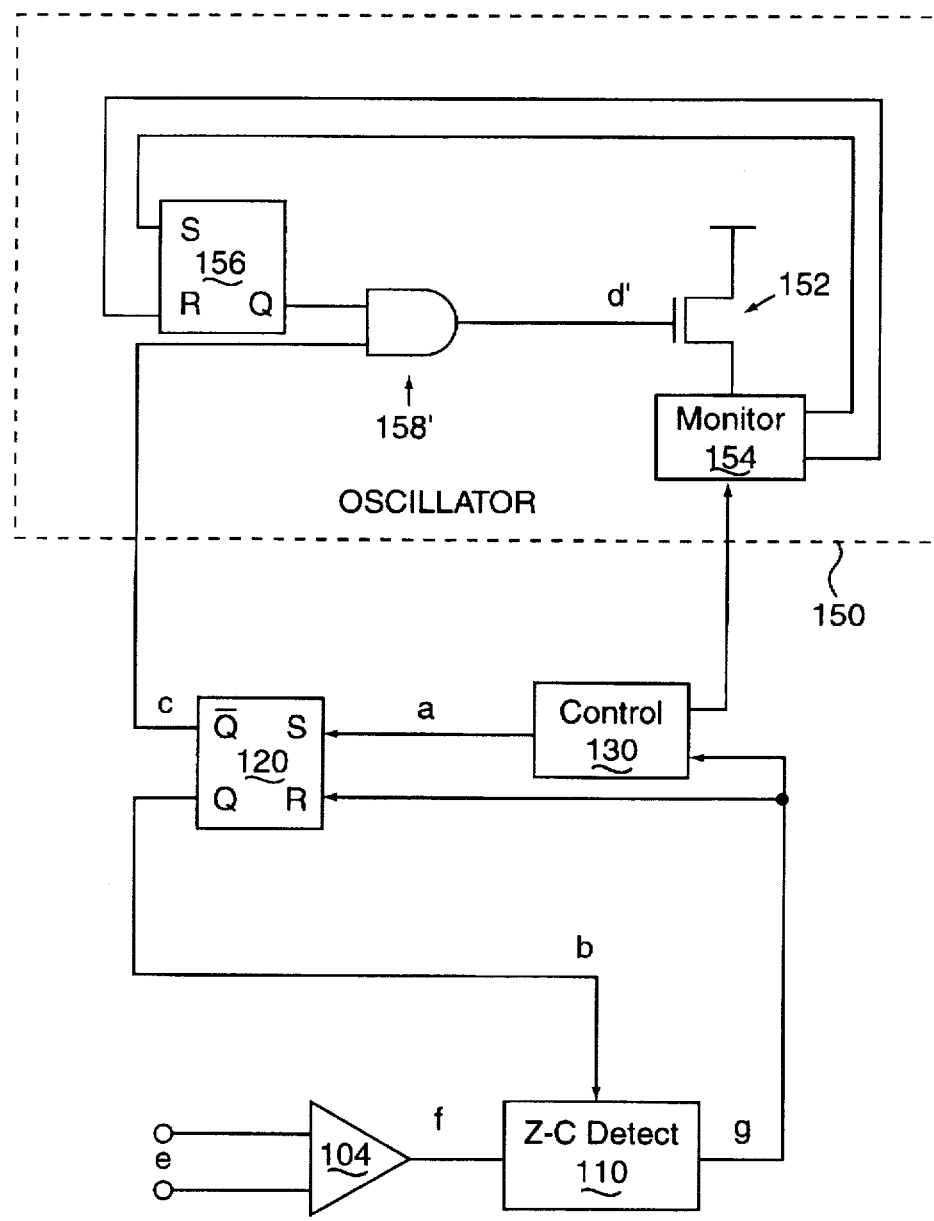
FIG. 2A shows key portions of an alternative circuit implementation.

FIG. 2A shows key portions of an alternative circuit implementation. In this implementation the blocking gates 158 are replaced by a single blocking gate 158' at the output of the flip-flop 156.

Figure 2B:
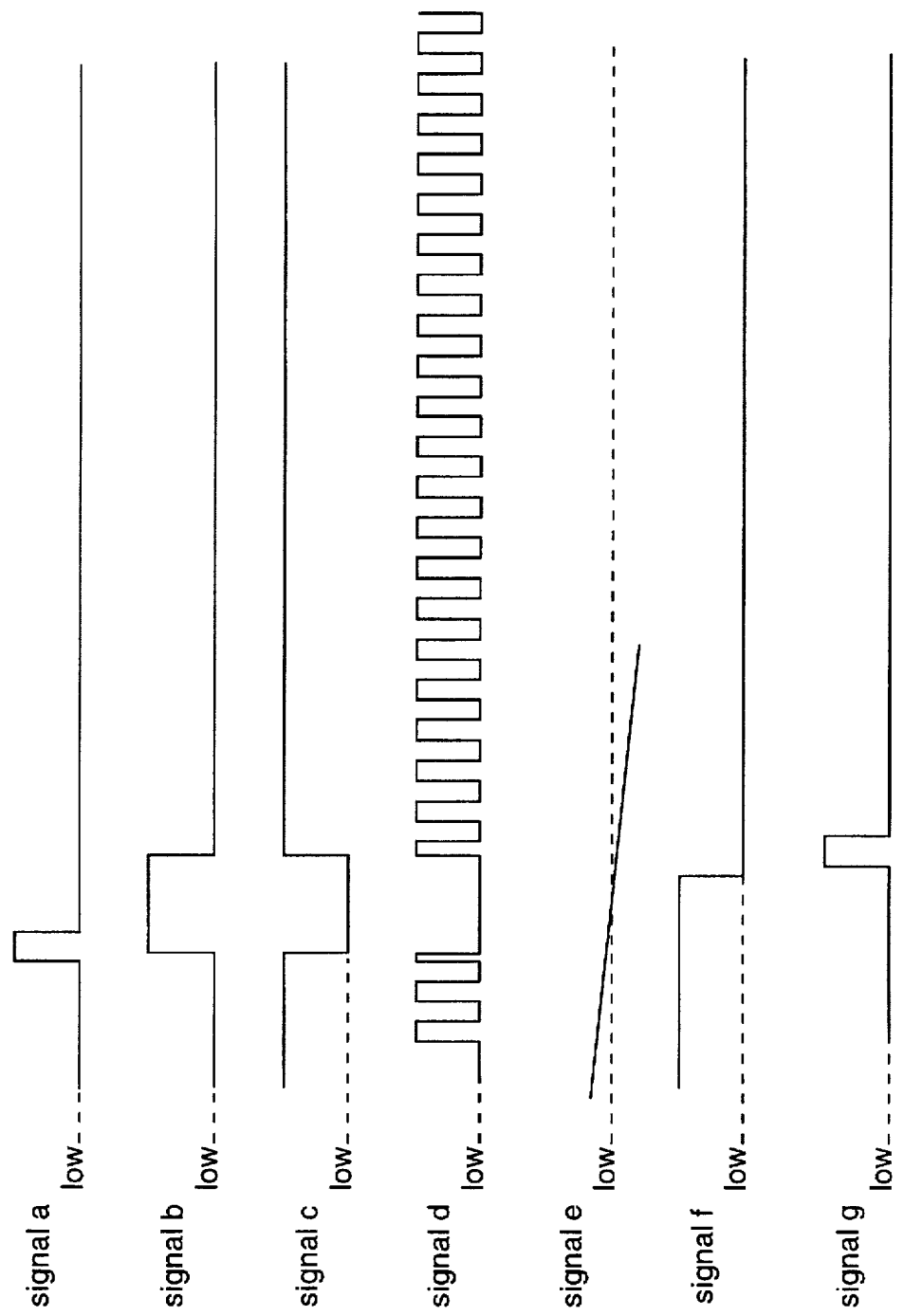
FIG. 2B shows sample timing waveforms from operation of the circuit of FIG. 2A.

FIG. 2B shows sample timing waveforms from operation of the circuit of FIG. 2A. These are generally similar to those of FIG. 1B, except that node d is forced to a low state when the oscillator is disabled.

Figure 3A:
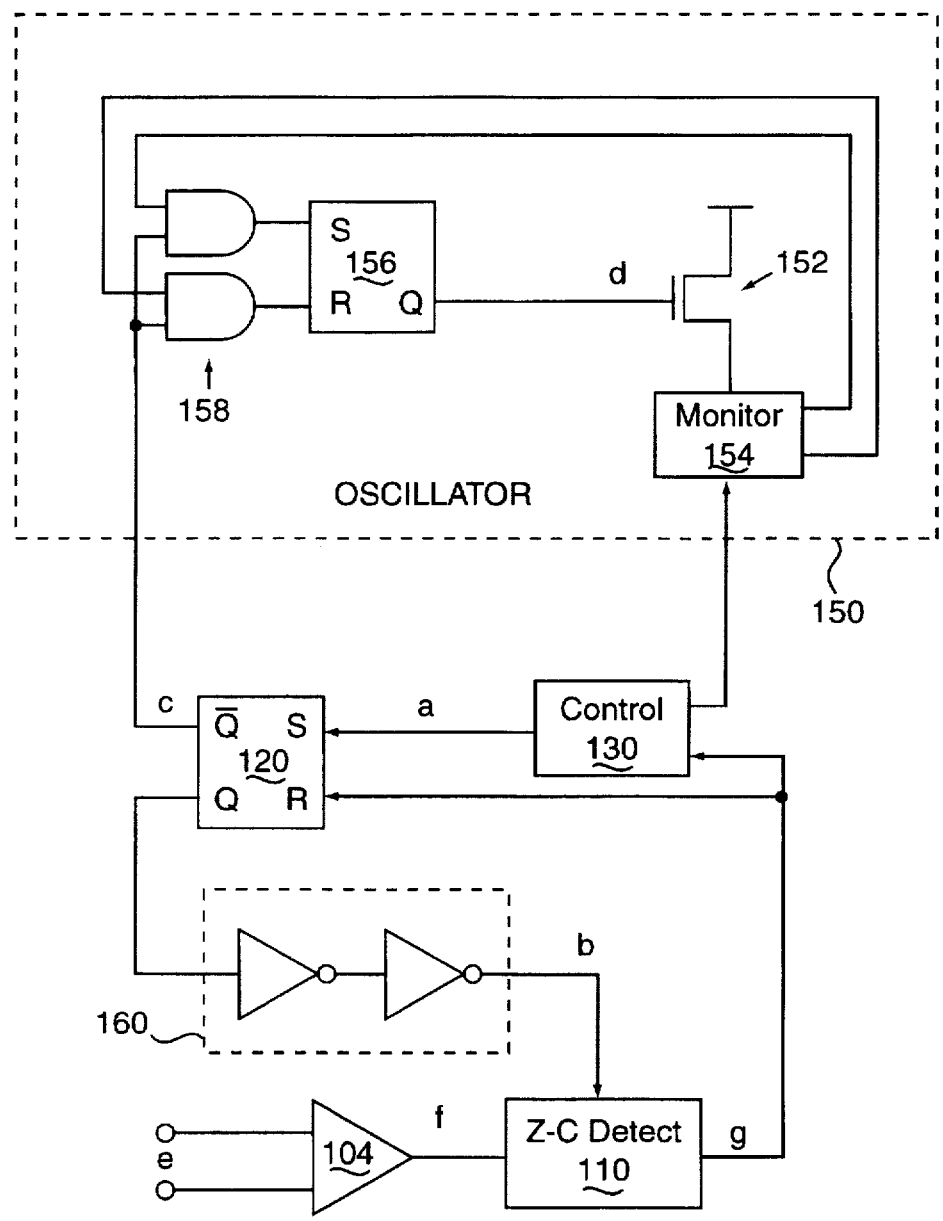
FIG. 3A shows key portions of another alternative circuit implementation.

FIG. 3A shows key portions of another alternative circuit implementation. This implementation is identical to that of FIG. 1A, except that a delay block 160 has been added in the enable signal to the zero-crossing detector. This provides additional margin against spurious zero-crossing detection due to switching noise occurring just as the zero-crossing detector is enabled.

Figure 3B:
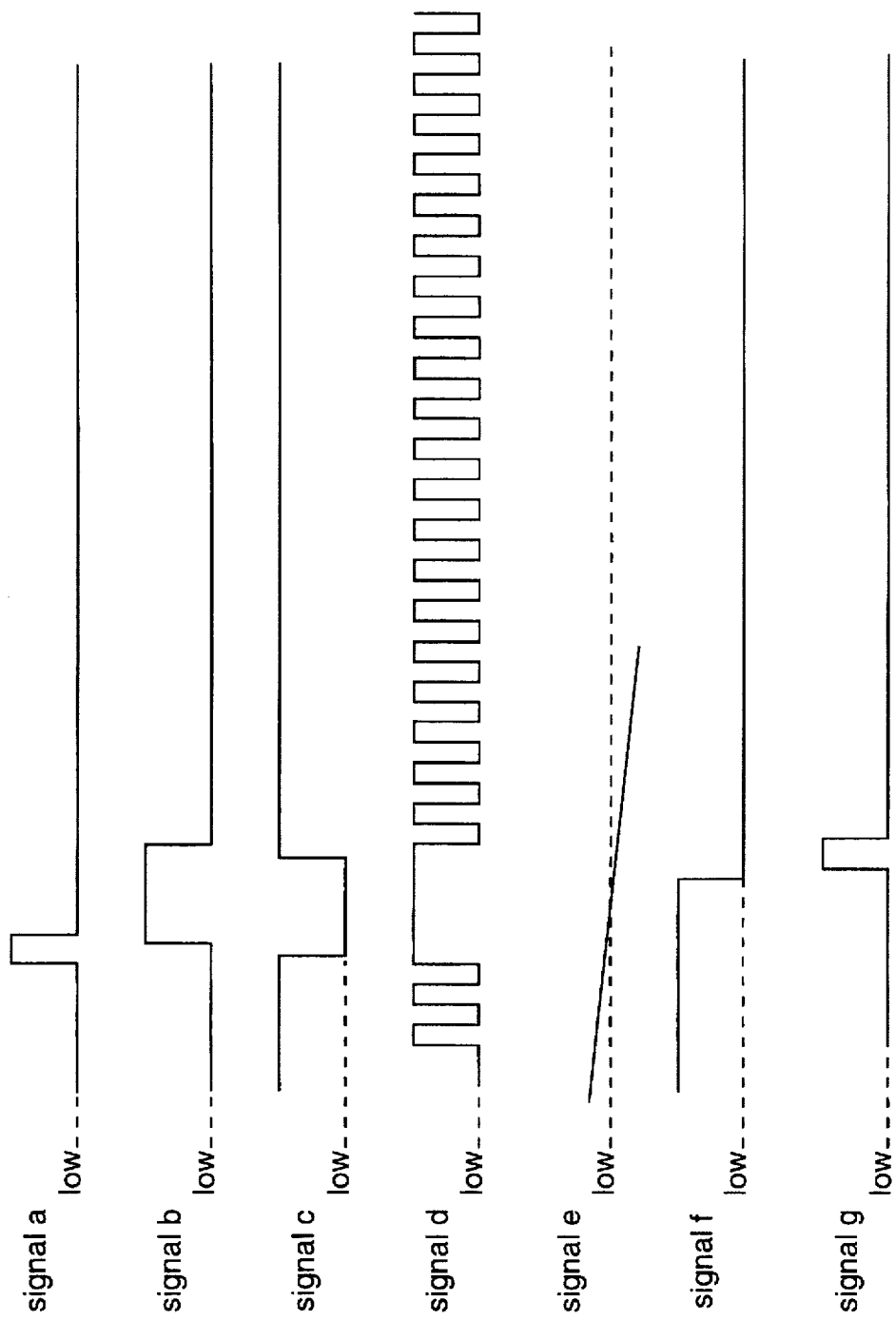
FIG. 3B shows sample timing waveforms from operation of the circuit of FIG. 1A.

FIG. 3B shows sample timing waveforms from operation of the circuit of FIG. 3A. These are generally similar to those of FIG. 1B, except that the rising edge on node b has been delayed by the delay stage 160.

Figure 4:
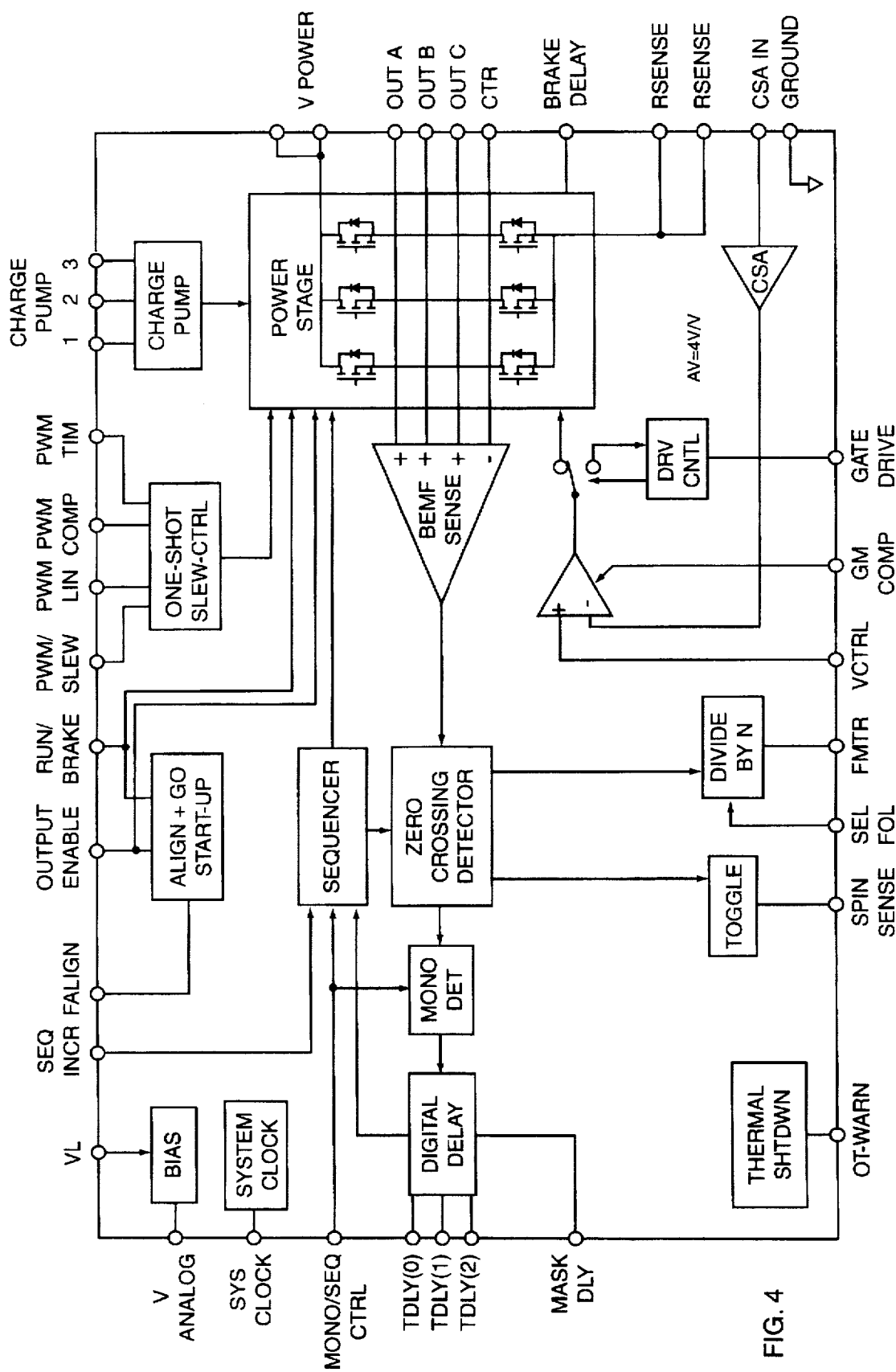
FIG. 4 shows a sample integrated circuit into which the circuit of FIG. 2 can advantageously be incorporated.

FIG. 4 shows a sample integrated circuit into which the circuit of FIG. 1 can advantageously be incorporated. The illustrated system is a sensorless spindle motor controller which provides a complete three-phase DC brushless spindle motor driver system. A power stage includes integrated three power transistor bridge circuits, driving the three outputs OUT_A, OUT_B, and OUT_C. (In the presently preferred embodiment, this power section can provide 2.5A motor drive. Alternatively, an external linear driver can be added for greater power- or current-handling capacity.) A BEMF sensing amplifier senses the voltage (with respect to the center tap) on whichever leg is floated. The digital delay, together with external signals, provides inputs to the sequencer which controls the power stage. This chip is described in much greater detail in the L6238S datasheet, which is available from SGS-Thomson and which is hereby incorporated by reference.

Figure 5:
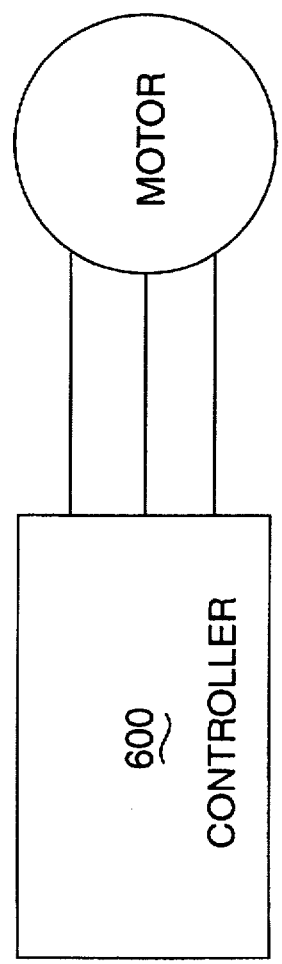
FIG. 5 shows a complete system, in which a chip 600 like that of FIG. 4 is connected to drive a motor M.

FIG. 5 shows a complete system, in which a chip 600 like that of FIG. 4 is connected to drive a motor M.

According to a disclosed class of innovative embodiments, there is provided: A method for controlling a brushless motor without using position sensing, comprising the steps, while the motor is running, of: a) generating a pulse-modulated signal, and using said pulse-modulated signal, under the control of control logic, to control switching of a power transistor which applies current to a selected coil of the motor; b) automatically generating an enable signal within a brief interval prior to an expected zero-crossing of induced voltage on a momentarily floating winding of the motor; c) when said enable signal is generated, then c.i.) interrupting said step (a.) of generating said pulse-modulated signal, and c.ii.) monitoring the voltage of said momentarily floating winding until a zero-crossing is detected, and thereafter c.iii.) resuming said step (a.) of generating said pulse-modulated signal; and d) controlling said pulse-modulated signal, using zero-crossing detections according to said step (c.ii.), to control said motor as desired.

According to another disclosed class of innovative embodiments, there is provided: A motor control circuit, comprising: zero-crossing detection logic connected to detect transitions in the polarity of voltage induced on a floating coil of a motor; and control logic connected to control an oscillator which is operatively connected to provide pulse trains to drive the control terminal of a switching transistor, and to provide an interrupt output when one of said transitions is expected imminently; said oscillator incorporating blocking elements which halt said pulse trains whenever said control logic provides an interrupt output, until said zero-crossing detection logic thereafter detects a transition.

According to another disclosed class of innovative embodiments, there is provided: A motor system, comprising: a brushless motor; a motor control circuit, connected to control application of power to said motor, comprising zero-crossing detection logic connected to detect transitions in the polarity of voltage induced on a floating coil of a motor; and control logic connected to control an oscillator which is operatively connected to provide pulse trains to drive the control terminal of a switching transistor, and to provide an interrupt output when one of said transitions is expected imminently; said oscillator incorporating blocking elements which halt said pulse trains whenever said control logic provides an interrupt output, until said zero-crossing detection logic thereafter detects a transition.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

For another example, the described control relations can also be implemented in software, in any chip which uses software control for the PWM oscillator—but hardware is more usual for control of the PWM oscillator (which is a relatively low-level function), and in such cases the present invention is also preferably implemented in hardware.

For another example, many different PWM oscillator configurations can be used. The illustrated example is merely one instance of a very large number of configurations which are well known to those of ordinary skill in the art. Other configurations may, for example, be frequency-locked rather than free-running, or may use different or more complicated feedback relations, or may be modified in any one of numerous other ways.

For another example, a wide variety of control logic implementations besides those shown may be used to provide control inputs to the PWM oscillator.

For another example, the described control relations can also be used with pulse modulation schemes which are not PWM, or not purely PWM.

What is claimed is:

1. A method for controlling a brushless sensorless motor in a pulse-width modulated mode of operation by detecting a zero crossing of an induced voltage in a momentarily floating winding of the motor, the method comprising:

generating a pulse-width modulated signal suitable for driving said motor, said pulse-width modulated signal transitioning between two states at a specific frequency;

temporarily causing said pulse-width modulated signal to remain in one of said two states, rather than transitioning at said specific frequency, during a brief interval beginning prior to an expected zero-crossing and ending after the expected zero-crossing has been detected by a zero-crossing detector; and commutating said motor in response to said detected zero-crossing, wherein the commutating occurs only during a commutation period that is outside of the brief interval beginning prior to an expected zero-crossing and ending after the expected zero-crossing has been detected by a zero-crossing detector.

2. The method of claim 1 wherein said zero-crossing detector further comprises a comparator coupled to said momentarily floating winding.

3. The method of claim 1 wherein said temporarily causing said pulse-width modulated signal to remain in one of said two states further comprises latching said one state of said pulse-modulated signal.

4. The method of claim 1 wherein said temporarily causing said pulse-width modulated signal to remain in one of said two states further comprises forcing said pulse-width modulated signal to a predetermined state.

5. The method of claim 1 wherein said zero-crossing detector is enabled only during said brief interval.

6. A motor control circuit for use in controlling a brushless sensorless motor in a pulse width-modulated mode of operation, said motor control circuit comprising:

zero-crossing detection logic configured to detect transitions in the polarity of a voltage induced on a floating coil of a motor;

control logic configured to predict an expected transition time of said transitions in polarity, and generate an interrupt output signal during a brief interval beginning shortly before said expected transition time and ending shortly after said expected transition is detected by said zero-crossing logic; and an oscillator coupled to said control logic and configured to produce a pulse-width modulated signal that transitions between two states when said interrupt output signal is not generated and remains in one of said two states when said interrupt output signal is generated by said control, and wherein the pulse-width modulated signal is for controlling an output of a drive current to the brushless sensorless motor, wherein the interrupt output signal is arranged to maintain the drive current during the brief interval beginning shortly before said expected transition time and ending shortly after said expected transition is detected by said zero-crossing logic.

7. A motor system, comprising:

a brushless sensorless motor, having a plurality of windings; and a motor control circuit as recited in claim 6, wherein the drive current controlled by said motor control circuit is supplied to said windings.

8. The motor control circuit of claim 6 further comprising:

a power device configured for receiving said drive current; and a current-sensor for sensing a power device current in the power device and causing the pulse-width modulated signal to transition based on the power device current being above or below a predetermined value, the current-sensor being disabled when the interrupt output signal is generated.

9. The circuit of claim 6, wherein said zero-crossing detection logic further comprises a comparator configured to receive said voltage signal and output a logic signal based thereon.

10. The circuit of claim 2, wherein said oscillator further comprises one or more blocking elements coupled to said control logic and responsive thereto to cause said pulse-width modulated signal to temporarily remain in said one of two states when said interrupt output signal is generated by said control logic.

11. The circuit of claim 10, wherein said blocking elements include at least one selected from the group of a logical AND gate and a RS flip-flop.

12. The circuit of claim 10, wherein said blocking elements are configured to latch said one of said two states of said pulse-width modulated signal.

13. The circuit of claim 10, wherein said blocking elements are configured to force said pulse-width modulated signal to a predetermined state.

14. The circuit of claim 6, wherein said zero-crossing detection logic is enabled only during said brief interval.

15. The system of claim 7, wherein said zero-crossing detection logic further comprises a comparator configured to receive said voltage signal and output a logic signal based thereon.

16. The circuit of claim 7, wherein said oscillator further comprises one or more blocking elements coupled to said control logic and responsive thereto to cause said pulse-width modulated signal to temporarily remain in said one of two states when said interrupt output signal is generated by said control logic.

17. The circuit of claim 16, wherein said blocking elements include at least one selected from the group of a logical AND gate and a RS flip-flop.

18. The circuit of claim 16, wherein said blocking elements are configured to latch said one of said two states of said pulse-width modulated signal.

19. The circuit of claim 16, wherein said blocking elements are configured to force said pulse-width modulated signal to a predetermined state.

20. The circuit of claim 7, wherein said zero-crossing detection logic is enabled only during said brief interval.

* * * * *